Feb. 24, 1942.　　T. W. HALL　　2,273,956
MICROMETER INDICATOR FOR MEASURING MACHINES
Filed Feb. 7, 1940
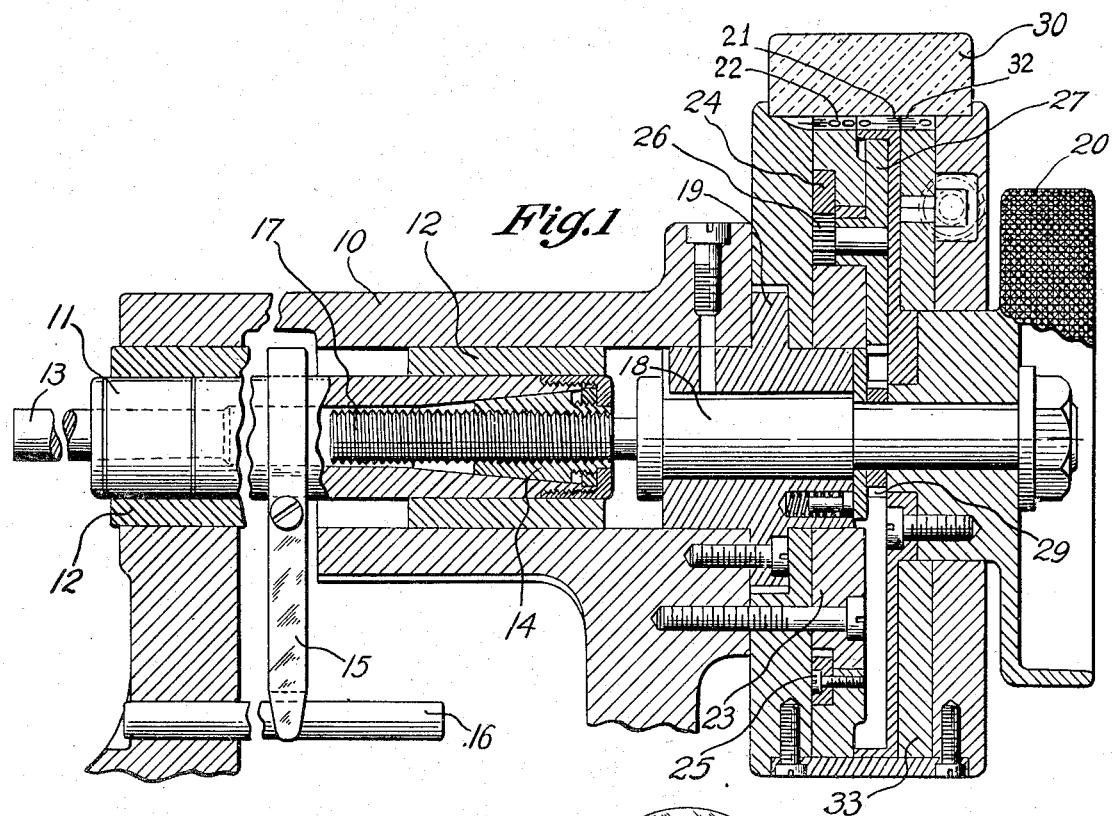
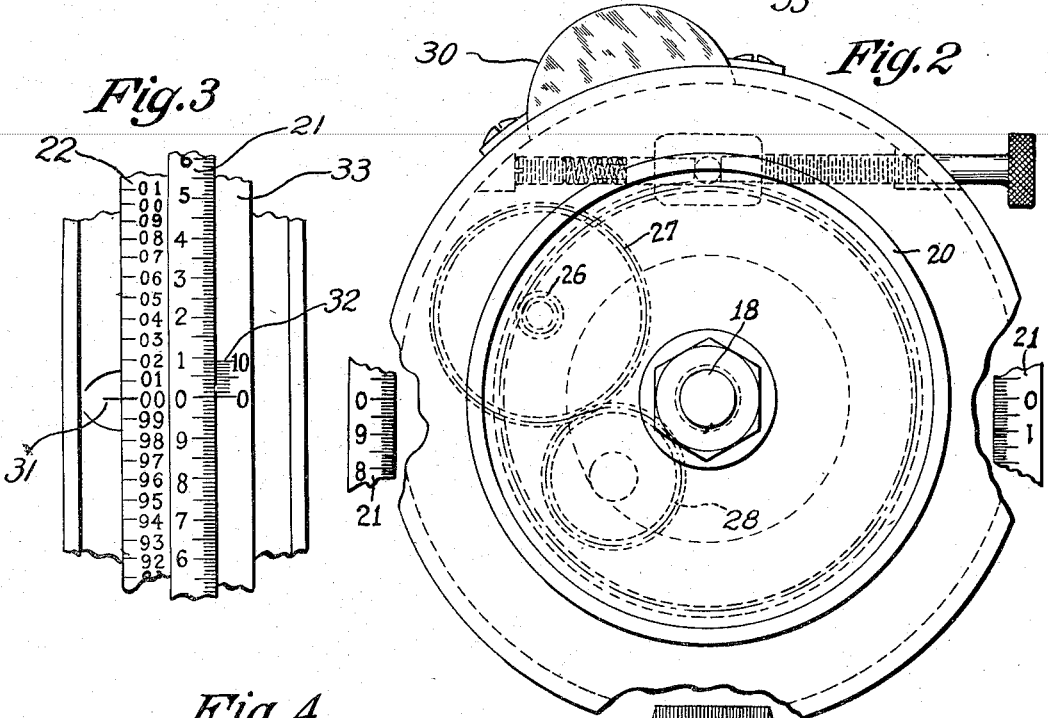
INVENTOR
T. W. Hall
BY Joseph W. Schofield
Attorney Patented Feb. 24, 1942

2,273,956

UNITED STATES PATENT OFFICE 2,273,956

MICROMETER INDICATOR FOR MEASURING MACHINES

Thomas W. Hall, Torrington, Conn., assignor to Niles-Bement-Pond Company, West Hartford, Conn., a corporation of New Jersey Application February 7, 1940, Serial No. 317,710

8 Claims. (Cl. 116—124)

This invention relates to linear measuring machines and particularly to a headstock and measuring indicator therefor having improved graduated dials to indicate the position to which the headstock spindle is adjusted.

An object of the invention is to provide a new system of graduations on the headstock spindle of a measuring machine so that they will facilitate reading the setting of the dials for any given position of the headstock spindle.

A feature that enables me to accomplish the above-named object is that there are provided a plurality of successive scales on the dial rotatable with the headstock spindle, each scale occupying an equal arc of the periphery of the dial and being graduated into a large number of equal parts.

Another object of the invention is to provide a supplemental rotatable dial adjacent the dial directly attached to the headstock spindle but at a reduced speed relative thereto, this supplemental or secondary dial being graduated preferably into a large number of graduations extending uniformly around the entire periphery of the disc and drivingly connected to the first dial to be rotated in timed relation but at a reduced speed relative thereto.

With the above and other objects in view the invention includes the features of construction and operation set forth in the following specification and illustrated in the accompanying drawing.

In the accompanying drawing annexed hereto and forming a part of this specification, I have shown the invention embodied in a precision linear measuring machine headstock but it will be understood that the invention can be otherwise embodied and that the drawing is not to be construed as defining or limiting the scope of the invention, the claims appended to this specification being relied upon for that purpose.

In the drawing:

Figure 1 is a longitudinal sectional view in elevation of the principal parts of a measuring machine headstock showing the mechanism forming the present invention in position therein.

Fig. 2 is an end elevation taken from the right-hand end of Fig. 1, and

Fig. 3 is a fragmentary view of a set of dials and their graduations made use of in the form of the invention selected for illustration.

Fig. 4 is a development of one of the graduated dials showing the series of scales used on its circumference.

In the above-mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a headstock or other principal body member having a spindle movable axially therein, there being provided means to prevent the spindle from rotating during its axial movement; second, a threaded member rotatably mounted within the headstock and engaging a correspondingly threaded nut provided within the rear end of the spindle; third, a graduated dial mounted on and rotatable with the threaded member; fourth, a supplemental graduated dial rotatably mounted adjacent and concentrically with the first dial and adapted to be driven therefrom at a different predetermined speed; fifth, a vernier dial also mounted coaxially with the first dial and having means to manually adjust its angular position relative to the first dial; and sixth, scales on said dials each graduated into a large number of divisions.

Referring more in detail to the figures of the drawing, I provide a headstock 10 with a spindle 11 mounted for axial movement therein. Preferably and as shown, the body member or headstock 10 has bearing sleeves 12 provided within a suitable bore within which the spindle can slide. At one end of the spindle 11 is mounted a measuring anvil 13 and at the opposite end is a nut 14 preferably adjustable within the spindle 11 in any well-known manner. Clamped to the spindle 11 and extending laterally therefrom is an arm 15, the outer end of which may be bifurcated to engage a bar or other member 16 mounted within the headstock. By means of this bar 16 rotation of the spindle 11 is prevented during its axial movement or, by laterally tilting the bar, a slight angular movement can be given the spindle 11 to correct the lead of the screw 17 engaging nut 14 and by means of which the spindle 11 is advanced.

Mounted coaxially with the slidable spindle 11 and held against axial movement within the headstock is a member 18 of which the screw 17 extending from one end thereof forms a part. Rotation of the member 18 and screw 17 engaging the nut 14 advances the spindle 11 within the headstock. This member 18 is rotatably mounted within a bearing member 19 secured in position against an end face of the headstock 18. By means of a hand wheel 20 keyed or otherwise secured to the outer end of the threaded member 18 the member 18 and its screw 17 may be rotated to vary the axial position of the spindle 11.

To determine the position to which the spindle 11 has been adjusted specially graduated dials 21 and 22 are provided. The first dial 21 may preferably be mounted directly upon the hub of the hand wheel 20 so that it will rotate therewith and with the screw 17 to advance the spindle 11 by engagement of the screw 17 with the threaded nut 14. This dial at its periphery is graduated, in the embodiment selected for illustration, into equal divisions extending completely about the periphery to form four scales each immediately succeeding another. Each of these scales may, as indicated, be graduated into one hundred equally spaced graduations so that there will be a total of four hundred graduations upon this dial. The zero of each scale corresponds with the maximum graduation of its adjacent scale. In Fig. 3 the beginning of one scale and the end of an adjacent scale are shown. As the pitch or lead of the screw 17 and the nut 14 in the spindle 11 is $\frac{1}{25}$ of an inch in the embodiment illustrated, each graduation of the scales on this disc will represent a distance moved by the spindle 11 of one ten-thousandth of an inch. A movement from the 0 to 100, that is, rotation of the dial 21 one-quarter of a revolution, will represent an axial movement of the spindle amounting to one one-hundredth of an inch. The graduations upon this dial 21 which is directly movable with the spindle 11 will therefore give the third and fourth digits indicating the setting of the spindle. To supply the first and second digits for any reading the supplemental dial 22 is made use of. This dial 22 is mounted concentrically with the first dial 21 upon a hub member 23 secured in position to the headstock. The dial member 22 carries an internal gear 24 set into one face and secured in position on the dial member 22 as by screws 25. Meshing with this internal gear 24 is the smaller gear 26 of a compound gear unit, the hub of which is supported for rotation within the fixed member 23 supporting the second dial 22. The larger gear 27 of this compound gear unit meshes with an idler 28 shown in dotted position in Fig. 2 and this idler gear in turn meshes with a pinion 29 keyed to the member 18 carrying the screw 17. The total gear ratio between the pinion 29 and the internal gear 24 is twenty-five to one so that the second dial 22 rotates once with its internal gear for each twenty-five rotations of the dial 21 and the screw 17. One complete rotation, therefore, of this secondary graduated dial 22, in the preferred embodiment of the invention in which the lead of the screw 17 equals one twenty-fifth of an inch, will represent axial movement of the spindle 11 of a full inch.

To facilitate reading the positions or indications of the two dials 21 and 22 a lens 30 is mounted adjacent an opening in the members supporting and enclosing the dials 21 and 22 adjacent a fixed zero line 31. Also a vernier scale 32 may be provided, this preferably being mounted upon an angularly adjustable member 33 so that its zero may be properly positioned for an initial setting of the spindle 11.

To read the indications of the dials 21 and 22 the lower graduation or numeral of the dial 22 adjacent the zero line 31 gives the first and second digits of the decimal part of an inch for which the spindle 11 is adjusted. The third digit, or thousandths of an inch, is given by the numeral of dial 21 adjacent the zero line of the vernier scale. The fourth digit, or ten-thousandths of an inch, is given by the individual graduation lines of the dial 21 adjacent the zero of the vernier 32. By reading the graduation of the vernier scale the hundred-thousandths of an inch can be determined.

What I claim is:

1. A micrometer indicator comprising in combination, a threaded spindle rotatably mounted in said micrometer and having a graduated dial rotatable therewith, said dial having a plurality of series of uniformly spaced graduations extending sequentially about its periphery, a second dial adjacent said first dial having a continuous series of graduations thereon, and means to rotate said second dial from a member rotatable with said spindle and first dial at a reduced speed relative thereto, said speed ratio being such that said first dial rotates as many times as there are threads per inch on said spindle during one rotation of said second dial.

2. A micrometer indicator comprising in combination, a threaded spindle rotatably mounted in said micrometer and having a graduated dial rotatable therewith, said dial having a plurality of series of uniformly spaced graduations extending sequentially about its periphery, a second dial coaxial with said first dial and having the same diameter, a continuous series of graduations on said second dial, and means to rotate said second dial from a member rotatable with said spindle and first dial at a reduced speed relative thereto, said speed ratio being such that said first dial rotates as many times as there are threads per inch on said spindle during one rotation of said second dial.

3. A micrometer indicator comprising in combination, a threaded spindle rotatably mounted in said micrometer and having a graduated dial rotatable therewith, said dial having a plurality of series of uniformly spaced graduations extending sequentially about its periphery, each of said series being equally spaced about its periphery and the beginning of one series following the end of another series, whereby the graduations thereof are uniformly spaced, a second dial adjacent said first dial having a continuous series of graduations thereon, and means to rotate said second dial from a member rotatable with said spindle and first dial at a reduced speed relative thereto, said speed ratio being such that said first dial rotates as many times as there are threads per inch on said spindle during one rotation of said second dial.

4. A micrometer indicator comprising in combination, a threaded spindle rotatably mounted in said micrometer and having a graduated dial rotatable therewith, said dial having four similar series of uniformly spaced graduations extending sequentially about its periphery, each of said series subtending a quadrant of said dial, a second dial adjacent said first dial having a continuous series of graduations thereon, and means to rotate said second dial from a member rotatable with said spindle and first dial at a reduced speed relative thereto, said speed ratio being such that said first dial rotates as many times as there are threads per inch on said spindle during one rotation of said second dial.

5. A micrometer indicator comprising in combination, a threaded spindle rotatably mounted in said micrometer and having a graduated dial rotatable therewith, said dial having a plurality of series of uniformly spaced graduations extending sequentially about its periphery, each series having a zero indicia coinciding with the maximum indicia of an adjacent series, a second dial adjacent said first dial having a continuous series of graduations thereon, and gear means to rotate said second dial from a member rotatable with said spindle and first dial at a reduced speed relative thereto, said gear ratio being such that said spindle and first dial rotate as many times as there are threads per inch on said spindle during one rotation of said second dial.

6. A micrometer indicator comprising in combination, a threaded spindle rotatably mounted in said micrometer and having a graduated dial rotatable therewith, said dial having a plurality of series of uniformly spaced graduations extending sequentially about its periphery, a second dial adjacent said first dial having a continuous series of graduations thereon, and gear means to rotate said second dial from a member rotatable with said spindle and first dial at a reduced speed relative thereto, said gear ratio being such that said first dial rotates as many times as there are threads per inch on said spindle during one rotation of said second dial.

7. A micrometer indicator comprising in combination, a threaded spindle rotatably mounted in said micrometer and having a graduated dial rotatable therewith, said dial having a plurality of series of uniformly spaced graduations extending sequentially about its periphery, each series having a zero indicia and all series forming collectively a uniformly graduated periphery, a second dial adjacent said first dial having a single continuous series of graduations thereon, and means to positively rotate said second dial from said spindle and first dial at a reduced speed relative thereto, said speed ratio being such that said first dial rotates as many times as there are threads per inch on said spindle during one rotation of said second dial.

8. A micrometer indicator comprising in combination, a threaded spindle rotatably mounted in said micrometer and having a graduated dial rotatable therewith, said dial having four series of uniformly spaced graduations extending sequentially about its periphery, a second dial adjacent said first dial having a single continuous series of uniformly spaced graduations thereon, and gear means to rotate said second dial from said spindle at a reduced speed relative thereto, said speed ratio being such that said first dial rotates as many times as there are threads per inch on said spindle during one rotation of said second dial.

THOMAS W. HALL.